United States Patent [19]

Harada

[11] Patent Number: 5,038,164
[45] Date of Patent: Aug. 6, 1991

[54] CAMERA HAVING AUTO-FOCUS APPARATUS

[75] Inventor: Yoshihito Harada, Yokohama, Japan

[73] Assignee: Canon Kabushiki Kaisha, Tokyo, Japan

[21] Appl. No.: 488,538

[22] Filed: Feb. 28, 1990

Related U.S. Application Data

[63] Continuation of Ser. No. 102,155, Sep. 28, 1987, abandoned.

[30] Foreign Application Priority Data

| Sep. 30, 1986 | [JP] | Japan | 61-232018 |
| Oct. 3, 1986 | [JP] | Japan | 61-236841 |
| Oct. 6, 1986 | [JP] | Japan | 61-237434 |
| Oct. 6, 1986 | [JP] | Japan | 61-237435 |

[51] Int. Cl.$^5$ ............................................. G03B 13/36
[52] U.S. Cl. .................................. 354/400; 354/402; 354/195.1
[58] Field of Search ........................... 354/400–408, 354/195.1, 195.11

[56] References Cited

U.S. PATENT DOCUMENTS 3,587,431 6/1971 Holler et al. .
4,274,725 6/1981 Gross .
4,470,681 9/1984 Johnson .
4,473,287 9/1984 Fukuhara et al. .
4,484,807 11/1984 Kataoka et al. .
4,572,644 2/1986 Kataoka et al. .
4,792,819 12/1988 Akashi .............................. 354/402
4,827,303 5/1989 Tsuboi .............................. 354/409
4,829,331 5/1989 Aihara .............................. 354/400

FOREIGN PATENT DOCUMENTS

| 56-1011128 | of 0000 | Japan . | |
| 0118136 | 5/1988 | Japan | 354/400 |
| 0118137 | 5/1988 | Japan | 354/400 |
| 2009949 | 6/1979 | United Kingdom . | |
| 2070794 | 9/1981 | United Kingdom . | |
| 2181262 | 4/1987 | United Kingdom . | |

Primary Examiner—Russell E. Adams
Attorney, Agent, or Firm—Fitzpatrick, Cella, Harper & Scinto

[57] ABSTRACT

A camera having an auto focus apparatus wherein a lens position and an aperture value obtained by focusing on two objects located at different positions are automatically calculated on the basis of a defocus amount detected by an auto focus; and photographing can be performed while both the objects are set in an in-focus state.

28 Claims, 7 Drawing Sheets

CAMERA HAVING AUTO-FOCUS APPARATUS

This application is a continuation of application Ser. No. 102,155 filed Sept. 28, 1987, now abandoned.

BACKGROUND OF THE INVENTION

1. Field of the Invention

The present invention relates to a camera having an auto focus apparatus.

2. Related Background Art

In a conventional technique for photographing a plurality of objects at different positions in an in-focus state, a camera is set in a stopped-down-aperture aperture state and an f-number or an aperture value is determined so as to obtain a depth of field which covers all the objects.

Under these circumstances, photographing precision greatly depends on the user's experiences. Such a technique is not suitable for an unskilled user, and the resultant picture is often out of focus.

U.S. Pat. No. 4,219,261 describes an auto focus camera. In this camera, data representing setting positions of a photographing lens for objects in different positions are stored in a memory, a sum of the setting positions is obtained, and a middle one of the setting positions is calculated from the sum signal. The photographing lens is manually moved to the middle position, and at the same time the corresponding aperture value (AV) is calculated according to differences between the setting positions so that the objects in the different positions can be simultaneously set in the in-focus state.

In the above camera, however, since the middle position and the aperture value are calculated according to the actual setting positions of the lens for the objects in different positions, focusing precision is degraded. In addition, even if the aperture is controlled according to the above-mentioned aperture value, it is difficult to set all the objects in the different positions in an in-focus state. More specifically, even if the lens is set in the middle position between two lens setting positions, a lens displacement to one lens setting position does not always coincide with that to the other lens setting position. Therefore, the aperture value derived from the two lens setting positions does not coincide with an aperture value represented by the depth of field which covers the above-mentioned lens displacements. Then, this camera cannot satisfactorily obtain a depth of field which covers both objects, thus resulting in an out-of-focus condition. Furthermore, since the lens is manually displaced in this camera, manual focusing operation for the two objects and therefore manual displacement of the lens to the middle position are required and high-speed photographing cannot be performed.

SUMMARY OF THE INVENTION

One aspect of the application is to move a lens to a middle position of objects in different positions on the basis of a defocus amount obtained by an auto focus apparatus so that a lens displacement between the middle position and a lens position for setting one object in an in-focus state coincides with that between the middle position and a lens position for setting the other object in an in-focus state.

Another aspect of the application is to provide a camera for obtaining an aperture value corresponding to a depth of field which covers two objects in different positions, on the basis of an object defocus amount obtained by an auto focus apparatus.

Still another aspect of the application is to calculate an aperture value corresponding to a depth of field which covers two objects in different positions, on the basis of an object defocus amount obtained by an auto focus apparatus, and the lens is driven to a position for internally dividing the defocus amount, thereby photographing the two objects in different positions within the depth of field which covers these objects.

Other objects of the present invention will be apparent from the following description of preferred embodiments in conjunction with the accompanying drawings.

DESCRIPTION OF THE PREFERRED EMBODIMENTS

Prior to a description of preferred embodiments, the principle of the present invention will be explained.

Assume that objects A and B are located at two different positions. In order to set these objects in an in-focus position, the lens must be focused at a middle position of these objects, i.e., a defocus amount of one object must coincide with that of the other object. In this state, since the defocus amount of the object A substantially coincides with that of the object B, the corresponding aperture value is set to a value corresponding to a depth of field which covers both the objects. Therefore, the objects A and B are simultaneously set in the in-focus state.

The depth of field is calculated such that a defocus amount from a focusing plane is divided by the diameter of a circle of least confusion, and therefore the corresponding aperture value is determined.

According to the present invention, the defocus amount of the object A is set so as to coincide with that of the object B, and this defocus amount is divided by the diameter of the circle of least confusion to obtain the aperture value, so that both the objects are simultaneously set in the in-focus state.

Preferred embodiments of the present invention will be described with reference to the accompanying drawings.

Figure 1:
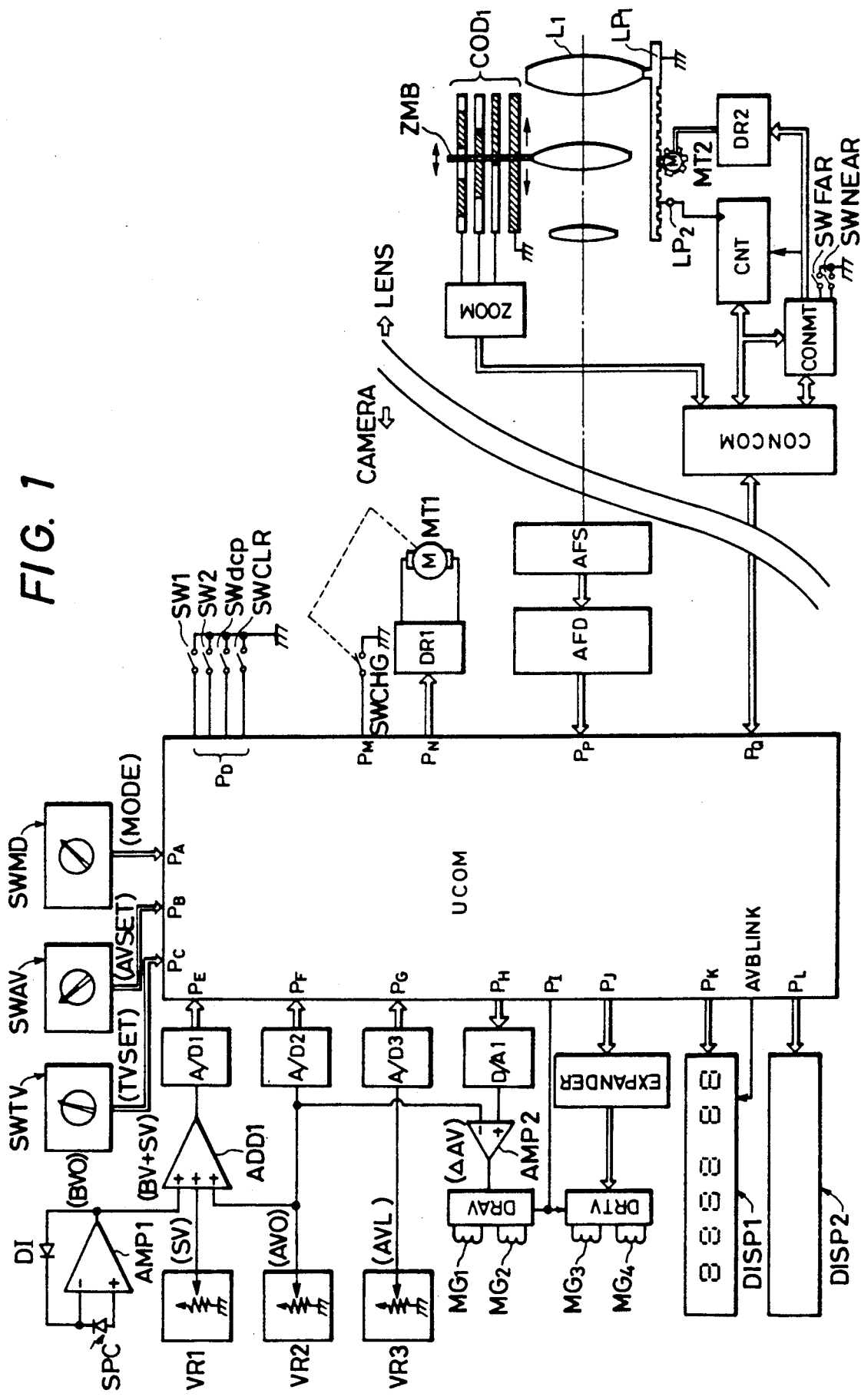
FIG. 1 is a circuit diagram of a camera employing an aperture control apparatus according to an embodiment of the present invention.

FIG. 1 is a circuit diagram of a camera having an aperture determining apparatus according to an embodiment of the present invention.

Referring to FIG. 1, this camera includes a photosensor SPC for TTL full-aperture metering, a diode D1, and an operational amplifier AMP1 serving as a known exposure metering circuit. The operational amplifier AMP1 outputs BV0 (brightness value 0) of the APEX (additive system of photographic exposure).

A speed value setting variable resistor VR1 generates an SV (speed value) of the APEX. A variable resistor VR2 sets a minimum aperture value (i.e., AV0 or aperture value 0 of the APEX) of the lens attached to the camera. Outputs from the variable resistors VR1 and VR2 and the exposure metering circuit are input to an amplifier ADD1 constituted by an adder. The amplifier ADD1 outputs an exposure value EV (=BV0+SV+AV0=BV+SV).

An A/D converter AD1 converts the output (the EV value of the APEX) into a digital signal, and the digital signal is input to the PE port of a microcomputer UCOM.

An A/D converter AD2 converts the output from the variable resistor VR2 into a digital signal and transmits it to the PF port of the microcomputer UCOM. A variable resistor VR3 sets a minimum aperture value (i.e., the minimum value on the stopped-down aperture side) AVL of the lens attached to the camera. An output from the variable resistor VR3 is supplied to the PG port of the microcomputer UCOM through an A/D converter AD3. In this case, the signal input to the PG port is a digital signal of the minimum aperture value AVL.

A mode switch SWMD sets a photographing mode (i.e., a shutter priority mode, an aperture priority mode, or a program mode) of the camera. Mode information is sent to the PA port of the microcomputer UCOM. A time value switch SWTV serves to set a time value or shutter speed. An aperture value switch SWAV serves to set an aperture value. The TV and AV values set by the time value and aperture value switches SWTV and SWAV are respectively input to the PC and PB ports of the microcomputer UCOM.

A D/A converter DA1 converts control aperture value data sent from the PH port of the microcomputer UCOM into an analog signal (voltage). An output from the D/A converter DA1 is input to an amplifier AMP2 constituting a subtracter. The amplifier AMP 2 calculates the output from the D/A converter DA1 with the value AV0 set by the variable resistor VR2 and outputs a stopped-down value (AV of the APEX).

An aperture control circuit DRAV includes an aperture control start magnet MG1 and stop magnet MG2 and controls the aperture on the basis of the output ΔAV from the amplifier AMP2. A real-time expander EXPANDER expands the time value data TV output form the PJ port from the microcomputer UCOM and performs shutter speed control. The shutter control circuit DRTV includes a front curtain magnet MG3 and a rear curtain magnet MG4 and drives them to move the shutter front and rear curtains.

The control circuits DRAV and DRTV are operated in accordance with signals from the PI port of the microcomputer UCOM to initiate control of the aperture and the shutter.

A display unit DISP1 performs digital display for causing a 7-segment display unit to display a shutter speed and an f-number which respectively correspond to the time and aperture values output from the PK port of the microcomputer UCOM. The display unit DISP1 causes the displayed values to blink according to a signal from the AVBLINK port of the microcomputer UCOM.

Figure 2:
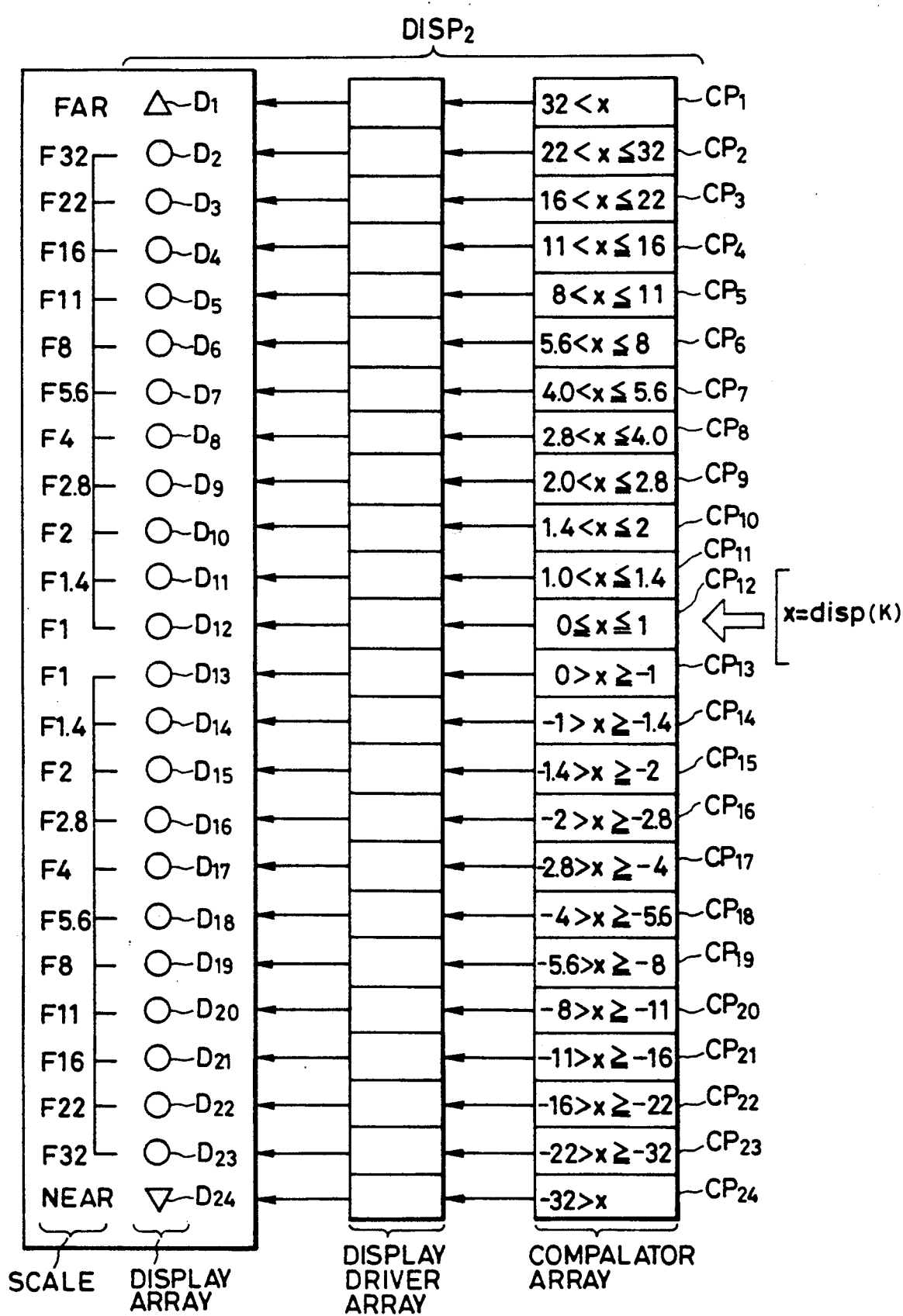
FIG. 2 is a circuit diagram showing an arrangement of a display unit DISP2 in FIG. 1.

An array display unit DISP2 shown in FIG. 2 includes comparators CP1 to CP24 for selectively outputting depth-of-field data DISP(K) output from the PL port of the microcoputer UCOM. A display driver array LDA selectively drives LEDs D1 to D24 in response to outputs from the comparators CP1 to CP24. A scale SCALE printed with f-numbers is disposed above the LEDs D1 to D24, thereby indicating an aperture value corresponding to depth-of-field data.

A switch SW1 is turned on upon a first stroke of a shutter button (not shown). A switch SW2 is turned on upon a second stroke of the shutter button. A switch SWdep is turned on upon depression of a first operation button (not shown), and a switch SWCLR is turned on upon depression of a second operation button (not shown). Outputs from these switches are input to the PD port of the microcomputer UCOM.

A motor driver DR1 is connected to the PN port of the microcomputer UCOM and drives a motor MT1 in response to a signal from the PN port. The motor MT1 drives a shutter charger and a film winder mechanism. A detection switch SWCHG is turned on upon completion of mechanical charging interlocked with the film winder mechanism and is turned off upon completion of shutter running. The detection switch SWCHG is connected to the PM port of the microcomputer UCOM. An auto focus detector AFD receives a signal from an auto focus sensor AFS for receiving object light incident through a photographing lens L1and calculates a defocus amount representing a deviation from an in-focus position. An output from the auto focus detector AFD is sent to the PP port of the microcomputer UCOM.

The above circuit elements are arranged in the camera, and the following elements are arranged in a lens to be attached to the camera, so that the camera can communicate with the lens.

A lens includes a zoom data generator comprising a zoom brush ZMB and a code pattern plate COD1. Zoom data from the zoom data generator is converted by a zoom encoder ZOOM, and the encoded data is sent to the PQ port of the microcomputer UCOM through a communication controller CONCOM.

Lens drive amount data input from the PQ port of the microcomputer UCOM through the communication controller CONCOM is supplied to an up/down counter CNT. A motor control circuit CONMT receives the lens drive amount data and a drive direction signal and determines a drive direction (forward or reverse) of the lens. The motor control circuit CONMT sends the direction signal to the counter CNT to determine a count-up or count-down mode. A motor drive circuit DR2 drives a motor MT2 in a direction determined by the motor control circuit CONMT. A lens L1 is driven along the optical axis by a mechanism interlocked with the motor MT2. A comb-like pattern LP1 is interlocked with the lens L1. Upon movement of the pattern LP1, a contact LP2 is turned on/off. Whenever the lens is moved by a unit length, the contact LP2 generates a pulse.

The operation of the apparatus shown in FIG. 1 will be described with reference to flow charts in FIGS. 3 and 4. The programs are stored in a ROM built into the microcomputer UCOM. Numerals in the flow charts represent program step numbers.

When a power switch (not shown) is turned on to energize the microcomputer UCOM, "power-up clearance" (PUC) is performed in step 1, and the following steps are executed.

Step 2: Signals are output from the PK and PL ports of the microcomputer UCOM to turn off the display units DISP1 and DISP2, and the display units DISP1 and DISP2 are turned off.

Step 3: Zero as depression count data n of the switch SEdep is set in the internal memory of the microcomputer UCOM, and aperture value AVdep in an aperture priority mode is set to zero. In step 3, the depression count n of the switch SWdep and the aperture value AVdep in the aperture priority mode are initialized.

Step 4: States of the swithes SW1 and SW2 are detected by the PD port of the microcomputer UCOM. If the microcomputer UCON determines that the switch SW1 or SW2 is ON, the flow advances to step 5. However, if the microcomputer UCOM determines that both the switches SW1 and SW2 are OFF, the flow advances to step 12.

When the shutter button is operated and the switch SW1 or SW2 is ON, the operation in step 5 is performed.

Step 5: A distance measuring subroutine in steps 67 to 69 is called and executed. In the distance measuring subroutine, step 67 and subsequent steps are executed.

Step 68: The auto focus detector AFD is driven to calculate a defocus amount Xnow on the basis of image light incident on the sensor AFS through the lens L1 and the defocus amount Xnow is input to the PP port of the microcomputer UCOM.

The zoom data from the zoom data generator is input to the PQ port of the microcomputer UCOM through the controller CONCOM.

Step 69: The distance measuring subroutine is ended and the flow returns to step 6 in the main routine.

Step 6: A lens drive amount MV is calculated on the basis of the defocus amount Xnow calculated in the distance measuring subroutine. It should be noted that the lens drive amount MV is determined as a value obtained by correcting the defocus amount Xnow on the basis of the zoom data, and that MV=Xnow on the basis of the zoom data, and that MV=Xnow is established when a lens attached to the camera is not a zoom lens.

Step 7: A lens drive routine in steps 70 to 72 is called, and steps 70 to 72 are executed.

Step 71: The lens drive amount signal MV is sent from the PQ port of the microcomputer UCOM to the pulse counter CNT through the communication controller CONCOM. In this case, the drive amount signal and the drive direction signal are output from the PQ port, and the motor control circuit CONMT determines the rotational direction of the motor.

In addition, the up/down mode of the counter CNT is determined in accordance with the drive direction signal. The motor control circuit CONMT supplies a drive signal to the motor driver DR2, and the motor MT2 is driven in a direction determined by the drive direction signal. The lens L1 can be moved along the optical axis. Axial movement of the lens L1 is converted into pulses by the comb-like pattern LP1 and the contact LP2, and the pulses are supplied to the counter CNT. When a count of the counter CNT coincides with the lens drive amount MV, the counter CNT outputs a coincidence signal. The motor MT2 driven by the motor driver DR2 under the control of the motor control circuit CONMT is stopped in response to the coincidence signal. For example, if the lens drive amount MV is given as 10, value "10" is set in the counter CNT. An instruction representing a down mode is supplied to the counter CNT. At the same time, an instruction representing forward rotation of the motor is supplied to the motor. When 10 pulses generated upon movement of the lens L1 are counted by the counter CNT, its count becomes zero, and the counter CNT generates a coincidence signal. The motor is stopped in response to the coincidence signal. The lens L1 is moved in the designated drive direction, and the in-focus state is obtained.

The defocus amount may be negative in accordance with a given deviation from the in-focus position of the lens. For example, if the defocus amount is −10, an instruction representing an up mode is supplied to the counter CNT. At the same time, an instruction representing reverse rotation is supplied to the motor. In this case, the lens is driven by the defocus amount MV in a direction opposite to that described above. The above operation allows movement of the lens by the drive amount MV to obtain an in-focus state.

The coincidence signal is sent to the microcomputer UCOM through the communication controller CONCOM, and the flow returns from step 72 to step 8 in the main routine.

Step 8: A photometering routine in steps 64 to 66 is called, and steps 64 to 66 are executed.

In steps 64 to 66, an output, i.e., the EV value of the A/D converter AD1 is input from the PE port. The flow returns to step 9 in the main routine.

Step 9: The calculation display 1 routine in steps 44 to 56 is called and steps 44 to 56 are executed.

Step 45: The microcomputer UCOM determines whether the depression count n of the switch SWdep is $n \geq 2$. If the switch SWdep has not been depressed even once, n=0 and the flow advances to step 48.

Step 48: Mode data is input to the PA port of the microprocessor UCOM. When the mode set by the mode switch SWMD is an aperture priority mode, the flow advances to step 50. However, if the mode is a program mode, the flow advances to step 49.

In step 47, the AV value (AVSET) set by the aperture value switch SWAV and input to the PB port of the microcomputer UCOM is read. A calculation "EV−AVSET =TV" is performed using the EV value obtained in step 51 of the exposure metering routine and the value AVSET. In step 49, an AV value one-to-one corresponding to the EV value obtained in the photometering routine is selected on the basis of the AV value table in accordance with the program stored in the microcomputer UCOM. The AV value is subtracted from the EV value to obtain the TV value.

In step 50, the TV value (TVSET) set by the time value switch SWTV and input to the PC port of the microcomputer UCOM is read. In step 52, a calculation "EV −TVSET =AV" is performed using the TVSET value and the EV value obtained in step 52 of the exposure metering routine.

The control TV and AV values corresponding to the set photographing mode are obtained in steps 48 to 52. These TV and AV values are transmitted from the PK port of the microcomputer UCOM to the display unit DISP1, and control shutter speed and f-number are displayed. The control AV value is sent to the D/A converter DA1 through the PH port of the microcomputer UCOM in step 54, and a voltage corresponding to the AV value is generated. In step 55, the control TV value is sent to the real-time expander EXPANDER through the PJ port of the microcomputer UCOM. The flow returns from step 56 to step 10 of the main routine.

Step 10: The state of the switch SW2 at the port PD port of the microcomputer UCOM is detected. If the microcomputer UCOM determines that the switch SW2 is on, the flow advances to step 11. Otherwise, the flow returns to step 3.

As has been described above, when the shutter button is set in the first stroke state and the switches SW1 and SW2 are respectively turned on and off, the operations in steps 3 to 10 are repeated. The lens is moved to the in-focus position on the basis of the distance measuring results. At the same time, the shutter speed and the f-number in the selected mode are displayed.

When the state of the shutter button is changed to the second stroke state, this is detected in step 10. The flow advances to step 11, and a sequence routine in steps 57 to 63 is called.

In step 58 of this routine, a signal is output from the PI port of the microcomputer UCOM and the aperture drive circuit DRAV is operated. The aperture control circuit DRQV drives the magnet MG1, and the magnet MG1 drives an aperture regulating member (not shown). At the same time, stopped-down operation of the aperture regulating member is performed by the output ΔAV from the amplifier AMP2, the magnet MG2 is energized, and the aperture regulating member is stopped.

The D/A converter DA1 outputs a voltage corresponding to the control aperture value AV. The voltage is then applied to the amplifier AMP2. An output from the amplifier AMP2 represents a value ΔAV derived from the control aperture value AV. The aperture is set to a position corresponding to the control aperture value AV. This aperture control scheme is known to those skilled in the art, and a detailed description thereof will be omitted. A variable resistor is arranged such that its resistance can be changed in accordance with changes in position of the aperture regulating member from its initial position. A comparator is also arranged to generate an output when a resistor output value by a change in resistance reaches the value ΔAV. The magnet MG2 is operated in accordance with an output from the comparator to stop operating the aperture regulating member, thus completing aperture control.

The magnet MG3 in the shutter control circuit DRTV is energized to cause the front curtain of the shutter to initiate running. At the same time, upon running of the front curtain, the real-time expander EXPANDER is operated, and time counting is started. The expander EXPANDER receives the control TV value, as described above, and generates a time counting output representing a period obtained by expanding the TV value. The magnet MG4 is then energized to initiate running of the rear curtain of the shutter. F-number (i.e., aperture value) and shutter speed (i.e., time value) control operations have been completed as described above. In step 59, a state of the switch SWCHG is detected. When the switch SWCHG is turned off, the flow advances to step 60.

The switch SWCHG is arranged to stop running the rear curtain of the shutter. Upon completion of the exposure operation, the flow advances to step 60. In step 60, the drive signal is output from the PN port of the microcomputer UCOM and the driver DR1 is actuated to drive the motor MT1. The motor MT1 drives the charging mechanism to perform shutter charging, aperture charging, and film feeding. When these charging operations are completed, the switch SWCHG is turned on. When the charging operations are detected and completed in step 62, a stop signal is output from the PN port of the microcomputer UCOM to energize the driver DR1. The motor MT1 is then stopped and the flow returns from step 63 to the main routine The control operations in steps 1 to 11 are camera operations in the normal state.

An operation will be described when the switch SWdep is depressed.

When the shutter button is not depressed after the power switch is turned on, the flow advances from step 4 to step 12. The operations in step 12 and subsequent steps are performed.

Step 12: A state of the switch SWdep is read at the PD port of the microcomputer UCOM. When the switch SWdep is ON, the flow advances to step 13.

Figure 5:
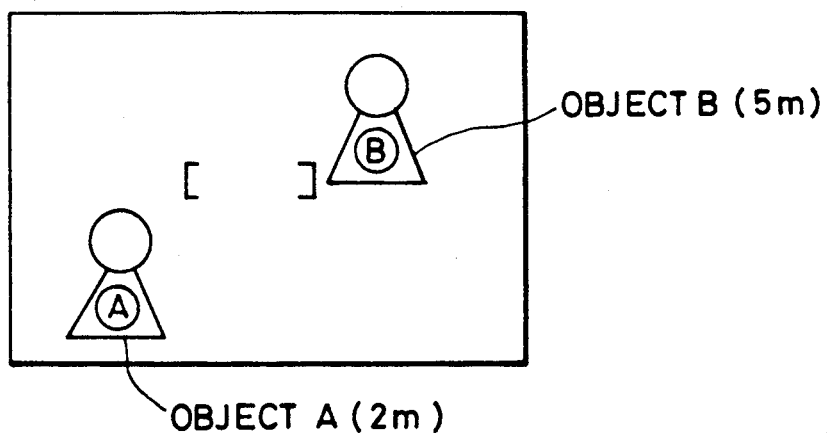
FIG. 5 is a view for explaining a field of view in a viewfinder in the camera shown in FIG. 1.

Assume that the first operation button is depressed while an object A in FIG. 5 is set in an in-focus position. In this case, the switch SWdep is turned on, and operation in steps 13 to 15 are performed. The operations in steps 13 to 15 are the same as those in steps 5 to 7. The lens is moved to the in-focus position on the basis of the distance measuring result.

Step 16: The depression count n of the switch SWdep is set. At the same time, the current depth-of-field data DISP(0) and depth-of-field data DISP(1) for the object distance (lens position) obtained upon the first depression of the switch SWdep are set to zero.

Step 17: The calculation display 2 routine in steps 73 to 75 is called, and steps 73 to 75 are executed.

The current depth-of-field data DISP(0) and depth-of-field data corresponding to depth-of-field data DISP(n) of each depression cycle are displayed on the display unit DISP2.

In step 74, data DISP(0) and DISP(n) as DISP(k) are generated. Since n=1 is established in step 16, the data DISP(n) is given as DISP(1). Therefore, data DISP(0) and DISP(1) are given as DISP(k). Since 0 is set in DISP(0) and DISP(1) in step 16, 0 is output as the data DISP(k).

Data DISP(0) =0 and DISP(1) =0 as DISP(k) are input to the display unit DISP2 through the PL port of the microcomputer UCOM.

The display unit DISP2 has the arrangement shown in FIG. 2. Data DISP(0)= −0 and DISP(1) =0 form the PL port of the microcomputer UCOM are detected by the comparator array of the comparators CP1 to CP24. A driver is selected on the basis of the detection result. Since both the data DISP(0) and data DISP(1) are zero, the comparator CP12 generates an output, and a dot D12 corresponding to the comparator CP12 and located on the scale F1 is turned on.

When the calculation display 2 routine is completed, the flow advances to step 18.

Step 18: The state of the switch SWdep is detected again in this step. If the switch SWdep is OFF, the flow advances to step 19. Otherwise, the flow advances to step 27.

Assume that the switch SWdep is kept off after it is turned on once.

In this state, the photometering routine is executed in step 19 to obtain the defocus amount Xnow. Since the lens is moved to a position corresponding to the object in a distance-measured field of view upon depression of the switch SWdep, a defocus amount is a defocus amount for the currently framed object with respect to the lens position in the in-focus state for the object at the time of the first depression of the switch SWdep. After the defocus amount for the currently framed object is obtained, step 20 is executed.

Step 20: The defocus amount Xnow on the basis of the distance measuring result is divided by the circle of least confusion having a diameter of 35 μm.

Since the depth of field can be calculated by using the defocus amount and the circle of least confusion, the depth-of-field data required for setting the current object in an in-focus state is obtained while the lens is kept in the in-focus position with respect to the object position measured upon depression of the switch SWdep, and the calculated depth-of-field data is given as the data DISP(0).

Step 21: The calculation display 2 routine is executed. In this routine, the depth-of-field data DISP(0) and DISP(1) are displayed.

The depth-of-field data DISP(0) is obtained in step 20. Since the data DISP(1) is zero, LEDs corresponding to FNO (f-number) and F1 corresponding to the depth-of-field data obtained in step 20 are turned on.

Assume that a distance between the camera and the object measured upon depression of the switch SWdep is 2 m and is changed from 2 m to 3 m at the time of a distance measurement in step 19, and that a defocus amount at that time is given as 450 μm. Under these assumption, the data DISP(0) °12.8. Therefore, the detection output is generated by the comparator CP4 shown in FIG. 2, and the LED corresponding to the dot D4 is turned on. It is indicated that in order to set the object which is away 3 m from the camera in the in-focus state while the lens is kept focused for the object away 2 m therefrom, the required f-number (i.e., aperture value) is F16.

Thereafter, the photometering routine and the operation display 1 routine are executed in steps 22 and 23. In this case, the f-number and the shutter speed are displayed on the basis of the exposure measuring result.

Step 24: The microcomputer UCOM detects the state of the switch SWCLR and determines whether the second operation button is depressed. If the microcomputer UCOM determines that the second operation button is depressed and the switch SWCLR is kept ON the flow returns to step 2. The operations in step 2 and the subsequent steps are performed again. The second operation button serves as a clear button. Upon depression of the clear button, an operation for displaying the depth of field is inhibited, and the normal mode is restored. However, when the second operation button is not depressed, the flow advances to step 25.

Step 25: The current zoom data is supplied from the zoom data generator to the PQ port of the microcomputer UCOM through the communication controller CONCOM. The microcomputer UCOM determines whether the current zoom data coincides with the previous zoom data. If a noncoincidence is detected, i.e., if a zoom ratio is changed in the above operation, the flow returns to step 2 and the normal operation mode is restored.

The depth of field is changed by the zoom ratio. When the zoom ratio is changed while the depth-of-field data is calculated by the series of operations described above, the contents of the display unit DISP2 do not display the accurate depth of field. Therefore, according to the present invention, the change in zoom ratio is detected. Whenever the zoom ratio is changed, the camera is set in the normal operation mode.

If the zoom ratio is not changed, however, the flow advances to step 26, and the operating state of the switch SW2 is detected in step 26. If the switch SW2 is OFF, the flow returns to step 18 again. Once the switch SWdep is turned on, and when the switches SWdep, SW2, and SWCLR are kept off and the zoom ratio is not changed, the operations in steps 18 to 26 are repeated. The FNO (f-number) is repeatedly displayed at the display unit DISP2 to focus the current object while the lens is kept focused for the object measured upon the first depression of the switch SWdep.

In this case, when the shutter button is set in the second stroke state, the flow returns to step 11. The above sequence routine is executed to photograph the object. The aperture value is controlled on the basis of the time and aperture values obtained in steps 22 and 23 which are obtained immediately before the shutter button is set in the second stroke state.

An operation will be described in which the switch SWdep is depressed again once it is depressed and released.

In this case, since depression of the switch SWdep is detected in step 18 while the operations in step 18 to 26 are repeated, the flow advances to step 27 and subsequent steps. The operations in step 27 and subsequent steps are performed.

Step 27: The depression count n of the switch SWdep is incremented by one. Assume that the switch SWdep is depressed twice. The first depression of the switch SWdep sets n =1 in step 16. Therefore, the depression count n is updated to n=2.

Step 28: The distance measuring routine is executed. A defocus amount Xnow is calculated for focusing the object measured upon the second depression of the switch SWdep while the lens is kept focused for the object measured upon the first depression of the switch SWdep.

Step 29: A calculation "X(n) =Xnow +XT" is performed where X(n) is the defocus amount obtained when the depression count of the switch SWdep is n, and XY is the common defocus amount for objects at different positions. Since the defocus amount XY is set to step 16, the calculation result is derived as X(2)= Xnow.

Step 30: A calculation $$"XP = \left( \sum_{k=1}^{n} X(k) \right)/n"$$

is performed.

Since n=2, the data XP is calculated as (X(1) + X(2))/2. Since X(1) is set to zero in step 16, XP is given as X(2)/2=Xnow.

In this case, a displacement (i.e., a defocus amount) of the lens to be moved to a middle position between the current lens position and a lens position for focusing the object measured upon the current depression of the switch SWdep is calculated. In other words, the middle position between the object position measured upon the first depression of the switch SWdep and the object position measured upon the second or current depression of the switch SWdep is obtained.

For example, as shown in FIG. 5, when the distance between the camera and the object A measured upon the first depression of the switch SWdep is 2 m and an object B spaced by 5 m apart from the camera is to fall within the depth of field upon the second depression of the switch SWdep, the defocus amount Xnow=X(2) for focusing the object B while the lens is kept focused for the object A is calculated in step 29. In step 30, ½ of this defocus amount is obtained as the defocus amount XP for the middle position of the objects A and B which provides a common defocus amount to the objects A and B. For example, if the defocus amount Xnow=(X2) of the object B is 805 μm, the common defocus amount XP is 403 μm (=805/2).

5 Step 31: A calculation "XP−XY" is performed to obtain the lens drive amount MV. Since the defocus amount XY is set to zero, the lens drive amount MV is XP. In the above case, the lens drive amount is 403 μm. In this case, the lens drive amount MV is obtained after the value of (XP−XT) is corrected on the basis of the zoom data in the same manner as in step 6.

Step 32: The lens drive routine is executed, and the lens is moved from the position where the lens is kept focused for only the object A to the middle position (3.08 m away from the camera) having a common defocus amount 403 μm to the objects A and B.

Step 33: XT=SP is set.

Step 34: A calculation "ISP(k)={(X(k) − XY)}/35 μm (k=1 to n) is performed. Since n=2, then the following calculations are performed to focus the object positions up to the nth depression of the switch SWdep with respect to the current lens position:

DISP(1)=X(1)−XP/35μm

DISP(2)=X(2)−XP/35 μmG

As described above, X(1) is zero, X(2) is 805, and XP is 403. Therefore,

DISP(1)=−11.

DISP(2)=+11.5

Step 35: The display 2 routine described above is executed. The comparators CP4 and CP 21 shown in FIG. 2 are operated to turn on the dots D4 and D21 of the display array and the corresponding FNOs (f-numbers) are displayed.

Step 36: The absolute value of the maximum data of the data DISP(k) for the object positions measured in step 34 for the depth-of-field data is given as control aperture data FNOdep in this mode. In the above case, DISP(2)=11.5 is the aperture data FNOdep.

Step 37: The aperture data FNOdep is converted into an AV value of the APEX to obtain data AVdep.

Step 38: The data AVdep is compared with the minimum aperture value AVL (of the APEX). If AVdep>AVL, i.e., when the data AVdep is smaller than the data AVL, the AVdep value is updated to the minimum aperture value AVL in step 40.

However, if AVL≧AVdep, then the flow advances to step 39, and the microcomputer UCOM determines whether AVdep<AV0 is established. If AVdep<AV0, i.e., if the AVdep value represents a full-aperture state as compared with that of the AV0 value, the AVdep value is set to the limit values, i.e., AV0.

However, if AVdep≧AV0, then the flow advances to step 43.

The microcomputer UCOM determined in steps 38 to 42 whether AvL≧AVdep≧AV0 is established. If so, the AVBLINK terminal of the microcomputer UCOM is disabled in step 43, and the flow advances to step 18.

If AVdep>AVL, the AVdep value is set to the limit value i.e., AVL, and the AVBLINK terminal is enabled in step 41. The flow then advances to step 18. In this case, if the switch SWdep is kept off, the operations in step 19 to 23 are performed again. The depth-of-field data DISP(1) and DISP(2) obtained upon the first and second depression cycles of the switch SWdep and the depth-of-field data DISP(0) corresponding to the defocus amount for the current object position obtained in step 19 are displayed on the display unit DISP2 in the display 2 routine. Since DISP(1) and DISP(2) are given as +11.5 and −11.5, respectively, the dots D4 and D21 in FIG. 2 are turned on. FNO =FNOdep is displayed to focus both the objects A and B. An LED of the dot representing the FNO corresponding to the depth-of-field data DISP(0) for focusing the current object is turned on according to the common defocus amount for the objects A and B focused by the lens.

Since n=2 in the calculation display 1 routine, the operation in step 46 is executed, and the AVdep value is set to the AV value, and the operations in steps 51 to 56 are performed.

In this case, the AVdep value is displayed as the aperture value on the display 1 regardless of the modes. A TV value obtained by (EV−AVdep=TV) using the corresponding EV value is displayed as a time value, i.e., the shutter speed.

If AVdep>AVL, then the display value corresponds to the AVL value. At the same time, since AVBLINK terminal has been enabled in step 41, the LED for displaying the f-number blinks, thus indicating that photographing cannot be performed while both the objects A and B are in set in the in-focus state. However, if AVdep<AV0, then the LED does not blink because the AVdep value is set to be the AV0 value and the depth of field represented by the AV0 value is larger than that by the AVdep value.

When both the objects A and B are subjected to framing in a state wherein the AVdep value for focusing both the objects A and B is displayed, and when the shutter button is depressed to the second stroke, this state is detected in step 26. The flow returns to step 11, and the above sequence routine is executed. Therefore, the aperture is controlled on the basis of the AVdep value. Both the objects A and B can be photographed while they are kept in the in-focus state.

The above operations exemplify the case wherein the switch SWdep is depressed twice. An AVdep value can be obtained in the same manner as described above when the switch SWdep is depressed three or more times, and the resultant value is displayed and is used for aperture control.

Figure 6:
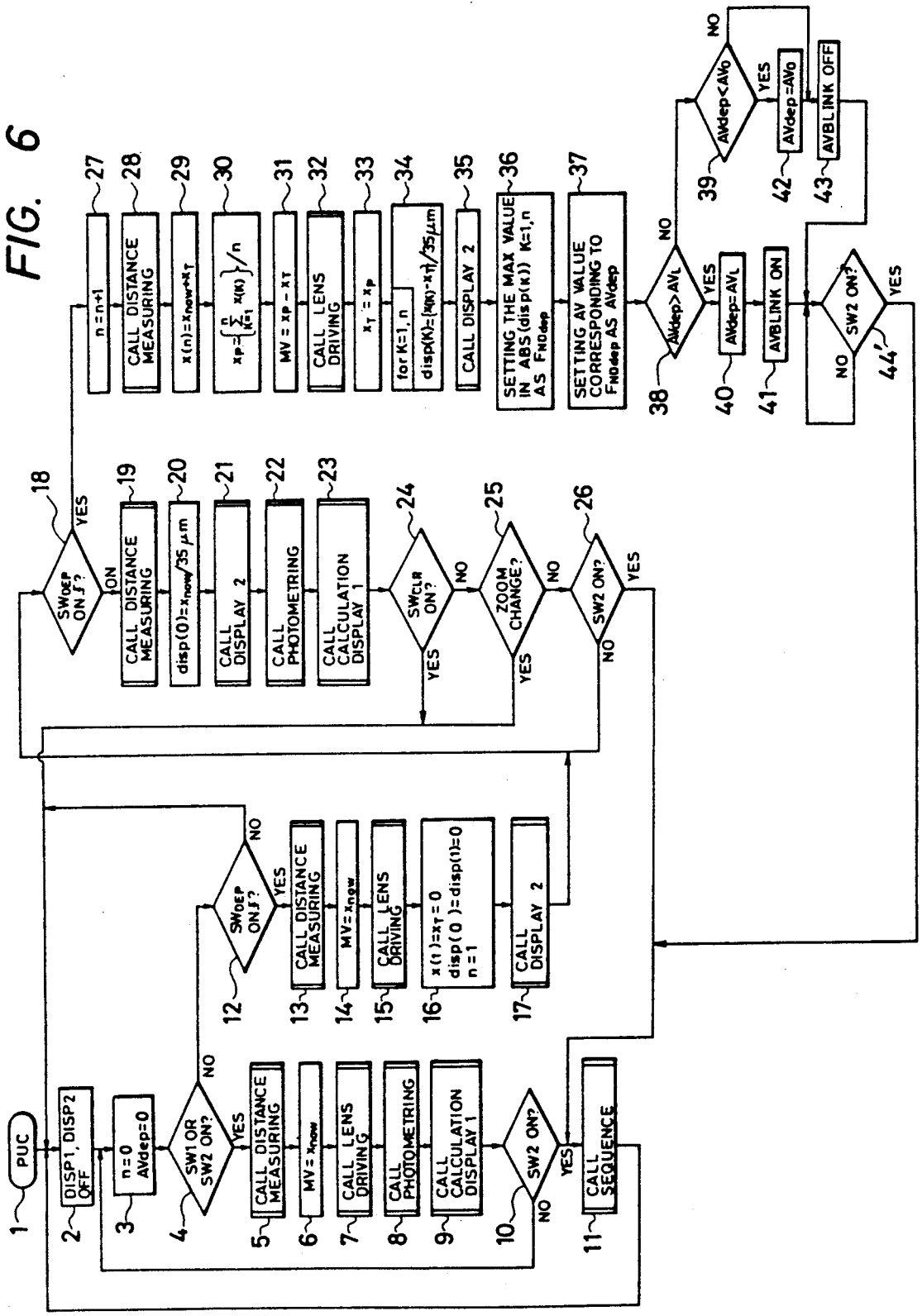
FIG. 6 is a flow chart showing a main routine in a microcomputer according to another embodiment of the present invention.

FIG. 6 shows a program flow according to another embodiment of the present invention. The same steps as in FIG. 3 denote the same reference numerals in FIG. 6.

Step 44' is added after flows 41 and 43 for the following effect. When the switch SWdep is depressed twice and the lens is moved to a position for focusing the two objects measured upon the respective depression cycles of the switch SWdep, the corresponding aperture value AVdep is obtained. Thereafter, even if the switch SWdep is depressed, the lens is not moved to another position or the current AVdep value is not updated.

More specifically, after the execution of step 41 or 43, in step 44', the microcomputer UCOM waits for the ON operation of the switch SW2 and executes step 11 upon the ON operation of the switch SW2. Therefore, the objects at different positions measured upon the depression cycles of the switch SWdep can be kept in the in-focus position.

According to the present invention, the lens can be automatically moved to a position where objects at different positions are simultaneously focused. Therefore, even a beginner can perform in-focus photographing.

In the above embodiment, the defocus amounts of the objects are identical. However, a defocus amount of the infinite object may be given as 10, and a defocus amount of the nearest object may be given as 7.

In this case, the aperture value may be obtained such that the defocus amount of the nearest or infinite object is divided by the diameter of the circle of least confusion.

In the above embodiment, the LEDs blink when the calculated aperture value is smaller than the minimum aperture value. However, an alarm element may be used. The alarm element may be an acoustic or visual element.

In the above embodiment, the defocus amount is divided by the diameter of the circle of least confusion. However, the aperture value may be arbitrarily adjusted to change the focusing range, i.e., the range of the depth of field.

What is claimed is:

1. A camera having an auto-focus device, comprising:
   focus detection means for detecting focus conditions to first and second objects, respectively;
   driving means for driving a lens to a predetermined position between a first position and a second position, said first position being determined in accordance with the focus condition detected to the first object and said second position being determined in accordance with the focus condition detected to the second object; and
   aperture control means for automatically setting an aperture value determined in accordance with the difference between said first position and said second position.

2. A camera according to claim 1, further comprising alarm means for generating an alarm when the set aperture value is smaller in aperture size than a limit aperture value of the lens.

3. A camera according to claim 1 further including an operation member, and wherein said focus detection means executes the focus detection operation in response to operation of said operation member, and wherein said driving means drives the lens to the first position corresponding to an in-focus condition for the first object in response to a first operation of the operation member, and wherein said driving means subsequently drives the lens to a position between said first position and said second position in response to a second operation of the operation member.

4. An auto-focus device for a camera, comprising:
   focus detection means for detecting focus conditions of first and second objects, respectively, and for providing defocus amounts in accordance with the detected focus conditions;
   driving means for driving a lens to a predetermined position between a first position and a second position, said first position being determined in accordance with the focus condition detected for the first object and said second position being determined in accordance with the focus condition detected for the second object; and
   aperture control means for automatically setting an aperture value determined in accordance with at least one of the defocus amounts.

5. An auto-focusing device according to claim 4, wherein said aperture control means includes an operation circuit which (1) calculates a value by dividing the defocus amount for the second object by a size of least confusion circle when the first object is in focus, and (2) sets the aperture value to a value corresponding to the calculated value.

6. An auto-focusing device according to claim 4 wherein said aperture control means includes an operation circuit which (1) calculates a value by dividing the difference between said first and second positions by a size of least confusion circle, and (2) sets the aperture value to a value corresponding to the calculated value.

7. A camera having an auto-focus detection apparatus for calculating a defocus amount for focusing on a second object while a lens is set in a first photographing position for focusing on a first object, and for driving the lens on the basis of the defocus amount, comprising:
   an aperture calculation circuit for calculating an aperture value on the basis of the calculated defocus amount; and
   an aperture control circuit for automatically setting an aperture to an aperture value corresponding to the aperture value calculated by said aperture calculating means.

8. A camera according to claim 7, wherein said aperture calculation circuit comprises a micro computer.

9. A camera according to claim 7, wherein said aperture control circuit includes a motor for driving an aperture member on the basis of the calculated aperture value.

10. A camera having an auto-focus device, comprising:
    focus detection means for detecting a focusing amount to obtain an in-focus condition for an object being photographed; and
    aperture control means for automatically setting an aperture to an aperture value corresponding to an amount between a first position in which a first object is in a focus condition and a second position in which a second object is in a focus condition, the first and second positions being detected by said focus detection means.

11. A camera according to claim 10, further including an operation member, and wherein said focus detection means performs a focus detecting operation upon each operation of said operation member, and wherein said aperture control means sets the aperture with a value corresponding to an amount between the first and second positions.

12. A camera according to claim 10, wherein said aperture control means includes an operation circuit for calculating a calculation value by dividing the amount between the first position and the second position by the size of a least confusion circle, and for setting the aperture to an aperture value corresponding to the calculation value.

13. A camera having an auto-focus device, comprising:
    focus detection means for detecting a focusing amount to obtain an in-focus condition for an object to be photographed;
    driving means for driving a lens to a position between a first position corresponding to an in-focus condition of a first object to be photographed and a second position corresponding to an in-focus condition of a second object to be photographed, said first and second positions being determined by said focus detection means; and aperture control means for automatically controlling an aperture in conformity with a focusing amount between said first and second objects.

14. A camera having an auto-focusing device, comprising:
   a focus detection circuit for detecting a focusing amount to obtain an in-focus condition for an object to be photographed;
   lens driving means; and
   a control circuit which causes the lens driving means to drive the lens to a first position corresponding to a first focusing amount detected by said focus detection circuit for a first object, causes said focus detection circuit to detect a second focusing amount for a second object while the lens is positioned at said first position, and causes said lens driving means to drive the lens to a position between the first position and a second position corresponding to said second focusing amount.

15. A camera having an auto-focus device, comprising:
   focus detection means for automatically detecting a focusing amount to obtain an in-focus condition for an object to be photographed; and
   aperture control means for automatically setting an aperture to an aperture value in conformity with the focusing amounts detected by said focus detection means for first and second objects to be photographed.

16. A camera according to claim 15, further comprising alarm means for generating an alarm when the set aperture value has a value which is reduced to an aperture size beyond a limit aperture value of the lens.

17. A camera having an auto-focus device comprising:
   a detection means for automatically detecting a lens position to obtain an in-focus condition for an object to be photographed; and
   aperture control means for setting an aperture to an aperture value corresponding to a first lens position to obtain an in-focus condition for a first object to be photographed and a second lens position to obtain an in-focus condition for a second object to be photographed, said first and second lens positions being detected by said detection means.

18. A camera having an auto-focus device, comprising:
   focus detection means for detecting a focusing amount to obtain an in-focus state for an object to be photographed;
   driving means for driving a lens to an intermediate position between a first lens position corresponding to an infocus state for a first object to be photographed and a second lens position corresponding to an in-focus state for a second object to be photographed, said driving means driving the lens to said intermediate position which is closer to a near end of the lens than a far end of the lens; and
   wherein said focus detecting means further detects a defocus amount between said first and second lens positions, and wherein said driving means drives the lens to said intermediate position obtained by dividing said defocus amount.

19. A camera according to claim 18, wherein said camera further comprises an operation circuit for calculating said first and second lens positions on the basis of the focus amounts detected for the first and second objects respectively obtained by said focus detection means, said operation circuit determining the intermediate position by dividing a difference between the first lens position and second lens position by a predetermined ratio.

20. A camera having an auto-focus device, comprising:
   detection means for detecting a lens position to obtain an in-focus condition for an object to be photographed, said focus detection means detecting a first lens position corresponding to an in-focus condition for a first object to be photographed and a second lens position corresponding to an infocus condition for a second object to be photographed;
   lens driving means for driving the lens to a position between the first and second lens positions and nearer to a near end of the lens than to a far end of the lens; and
   an operation circuit for calculating the position between said first and second lens positions by dividing a difference between the first and second lens positions by a predetermined ratio.

21. A camera having a plurality of aperture control modes including an auto mode in which an aperture value is determined corresponding to a luminance of an object and an aperture setting mode in which the aperture value is set to a predetermined value, comprising:
   a focus detection circuit for detecting a defocus amount for an object to be focused;
   a mode setting member for selecting a mode among said aperture control modes;
   an operation member independently operable from said mode setting member;
   an aperture value calculation circuit for calculating an aperture value on the basis of the defocus amount detected by said focus detection circuit, upon the operation of said operation member; and
   an aperture control mode changing circuit which cancels the aperture control mode selected by said mode setting member when said operation member is operated, and then executes aperture control according to the aperture value calculated by said aperture value calculation circuit.

22. A camera having an auto-focus device, comprising:
   a focus detection circuit for detecting, when a first object is in-focus, a focusing amount for rendering a second object in-focus, said second object being located at a different position from said first object; and
   an aperture control circuit for determining an aperture value which is capable of rendering said second object in-focus in conformity with said focusing amount, and for setting an aperture to the determined aperture value.

23. A camera according to claim 22, wherein said camera includes an operation circuit for calculating a distance between a predetermined lens position and a lens position corresponding to the focusing amount detected by said focus detection circuit.

24. A camera according to claim 23, wherein the lens position corresponding to the focusing amount detected by said focus detection circuit is determined in conformity with a defocus amount to the object.

25. A camera having an autofocus device, comprising:
   a focus detection and calculation circuit for detecting a focus amount for an object and for obtaining information regarding lens position to make infocus objects within a predetermined region which includes the object; and an aperture control circuit for determining an aperture value for the predetermined region, and for automatically setting the aperture to the determined aperture value.

26. A camera according to claim 25, wherein said calculating circuit calculates data regarding the lens position on the basis of the focus amount.

27. A camera having an auto-focus device, comprising:

focus detection means for detecting a focusing amount to obtain an in-focus state for an object to be photographed;

driving means for driving a lens to an intermediate position between a first lens position corresponding to a infocus state for a first object to be photographed and a second lens position corresponding to an in-focus state for a second object to be photographed, said driving means driving the lens to said intermediate position which is closer to a near end of the lens than a far end of the lens; and an operation circuit for calculating said first and second lens positions on the basis of the focus amount detected for the first and second objects respectively obtained by said focus detection means, said operation circuit determining the intermediate position by dividing a difference between the first lens position and the second lens position by a predetermined ratio.

28. A camera having an auto-focus device, comprising:

a focusing circuit for performing a focus operation, said focus operation including (1) a focus amount detection operation for determining a focus amount to an object, (2) a calculation operation for determining a control value concerning the lens position so as to make in-focus objects within a region including said object, and (3) a lens driving operation for driving the lens on the basis of the control value; and an aperture control circuit for controlling the aperture on the basis of information obtained in said focusing operation.

* * * * *

UNITED STATES PATENT AND TRADEMARK OFFICE
CERTIFICATE OF CORRECTION

PATENT NO. : 5,038,164

DATED : August 6, 1991

INVENTOR(S) : YOSHIHITO HARADA

It is certified that error appears in the above-identified patent and that said Letters Patent is hereby corrected as shown below:

On title page,

At [56] References Cited:

U.S. PATENT DOCUMENTS

Insert --4,362,372  12/1982  Kiesel-- and
       --4,154,517   5/1979  Tamura et al.--

FOREIGN PATENT DOCUMENTS

After "56-101128" change "of 0000" to --8/1981--.

IN THE DRAWINGS:

Sheet 1 of 7, FIG. 1, "SWdcp" should read --SWdep--.

Figure 3:
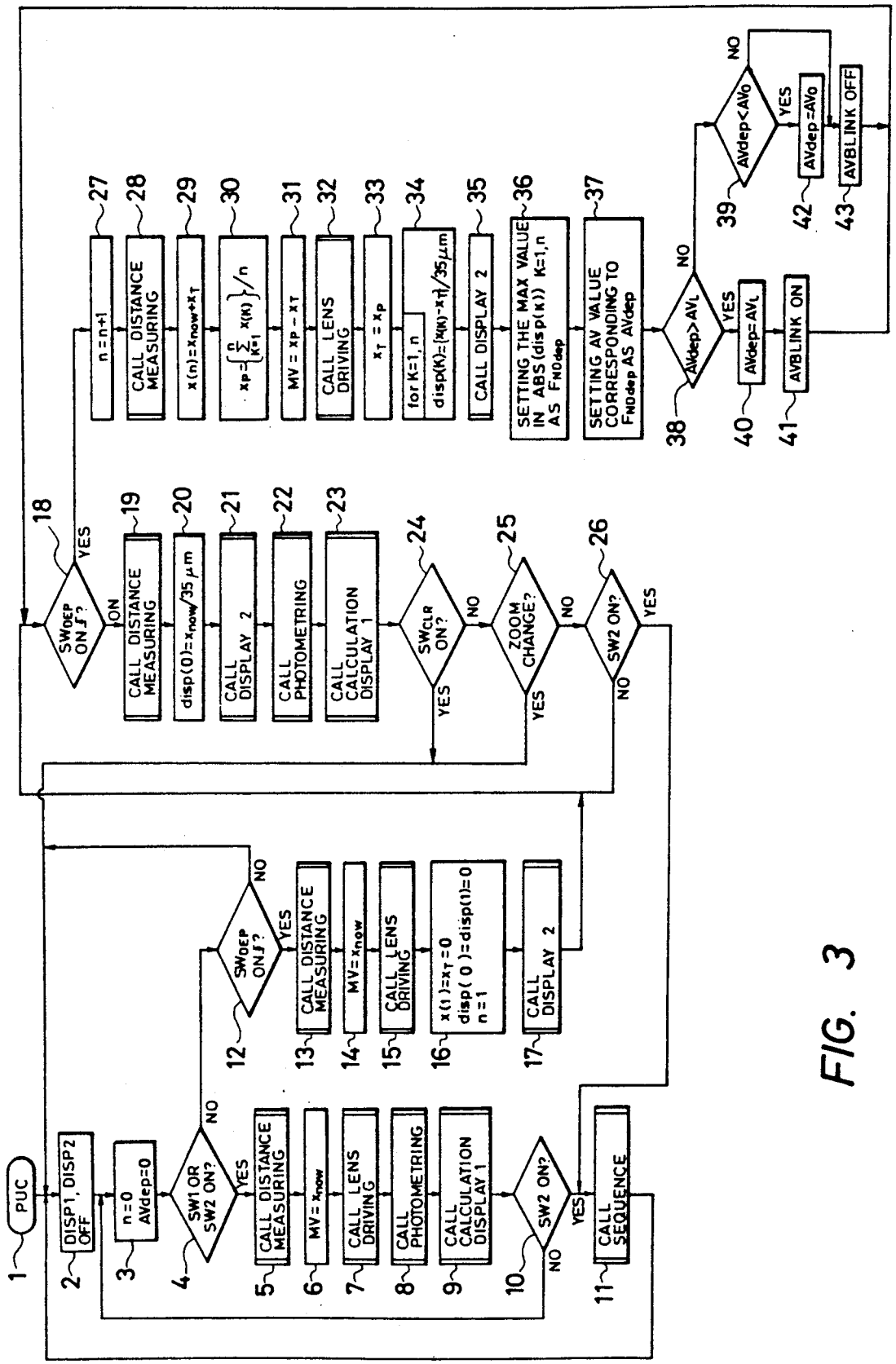
FIG. 3 is a flow chart showing a main routine stored in a microcomputer UCOM shown in FIG. 1.
Figure 4A:
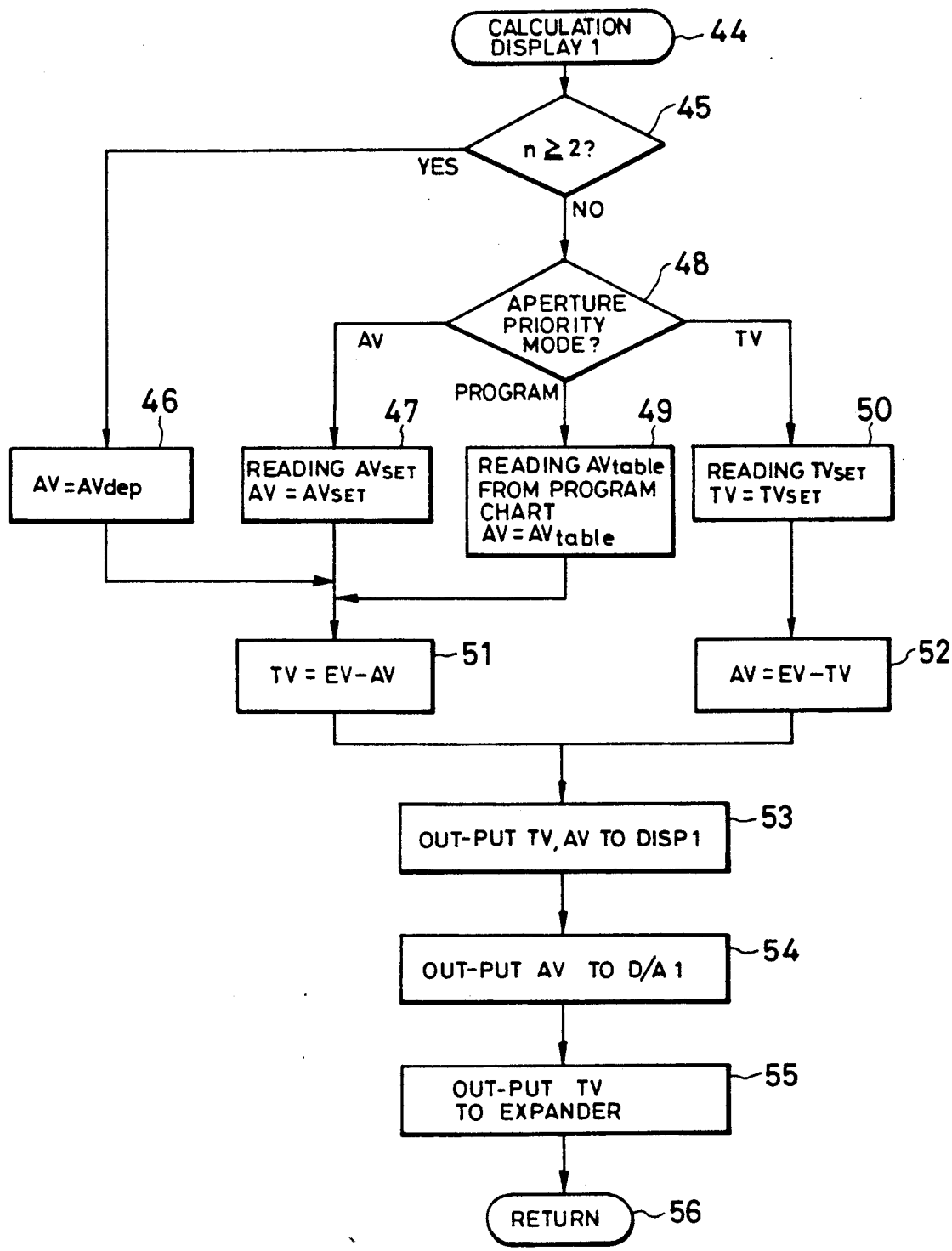
FIGS. 4A to 4F are flow charts showing subroutines stored in the microcomputer UCOM in FIG. 1.
Figure 4B:
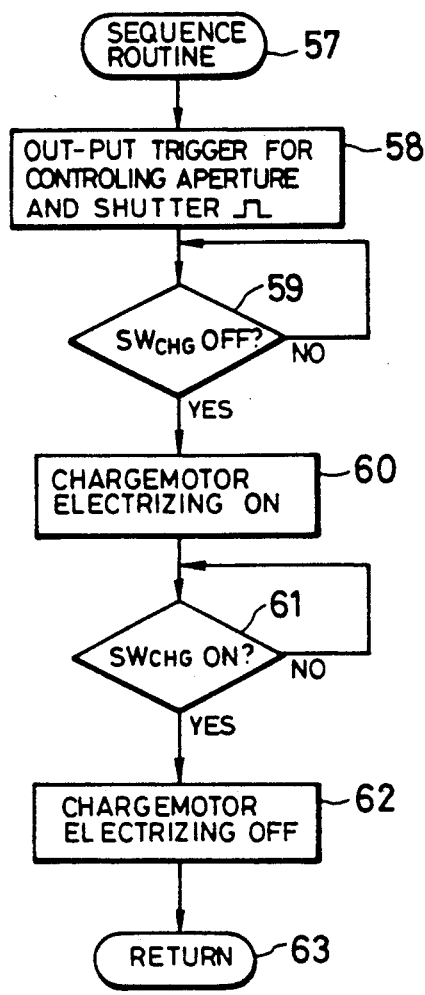
Figure 4C:
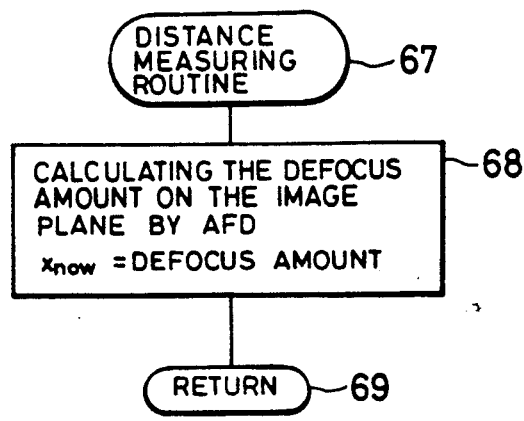
Figure 4F:
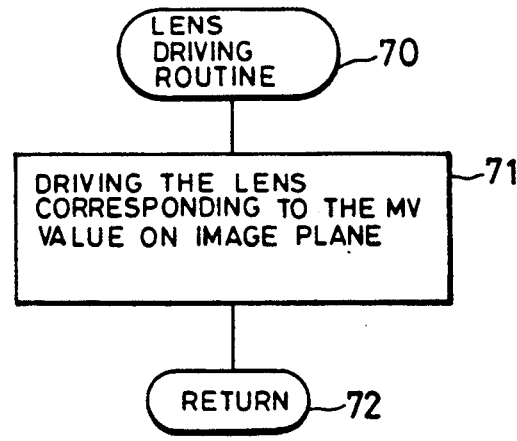
Figure 4D:
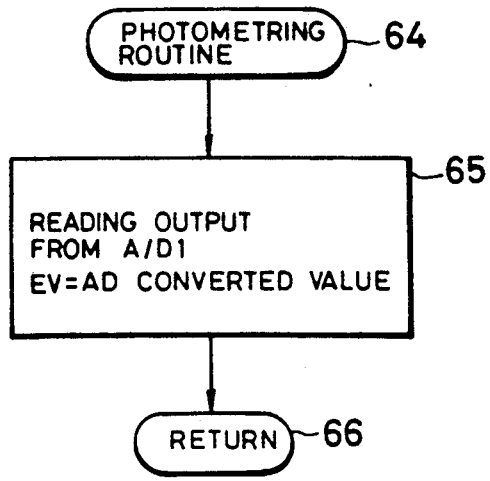
Figure 4E:
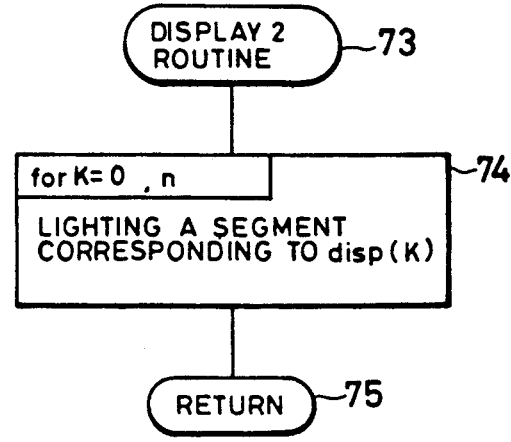

Sheet 2 of 7, FIG. 2, "COMPALATOR" should read --COMPARATOR--;

Sheet 3 of 7, FIG. 3, "PHOTOMETRING" should read --PHOTOMETERING-- (both occurrences);

Sheet 5 of 7, FIG. 4B, "CONTROLING" should read --CONTROLLING--, "CHARGEMOTOR" should read --CHARGE MOTOR-- (both occurrences), "ELECTRIZING" should read --ENERGIZING-- (both occurrences), and "PHOTOMETRING" should read --PHOTOMETERING--; and

UNITED STATES PATENT AND TRADEMARK OFFICE
CERTIFICATE OF CORRECTION

PATENT NO. : 5,038,164

DATED : August 6, 1991

INVENTOR(S) : YOSHIHITO HARADA

It is certified that error appears in the above-identified patent and that said Letters Patent is hereby corrected as shown below:

Sheet 7 of 7, FIG. 6, "PHOTOMETRING" should read --PHOTOMETERING-- (both occurrences).

At [57] ABSTRACT:

Line 1, "auto focus" should read --auto-focus--; and
Line 5, "auto focus; and photographing" should read --auto-focus. Photographing--.

COLUMN 1:

Line 10, "auto focus" should read --auto-focus--;
Line 14, "aper-" should be deleted;
Line 15, "ture" should be deleted;
Line 22, "auto focus" should read --auto-focus--; and
Line 60, "auto focus" should read --auto-focus--.

COLUMN 2:

Line 2, "auto focus" should read --auto-focus--;
Line 6, "auto" should read --auto-focus--; and
Line 7, "focus" should be deleted.

UNITED STATES PATENT AND TRADEMARK OFFICE
CERTIFICATE OF CORRECTION

PATENT NO. : 5,038,164

DATED : August 6, 1991

INVENTOR(S) : YOSHIHITO HARADA

It is certified that error appears in the above-identified patent and that said Letters Patent is hereby corrected as shown below:

COLUMN 3:

Line 42, "(AV" should read --ΔAV--;
    Line 48, "form" should read --from--; and
    Line 68, "microcoputer" should read --microcomputer--.

COLUMN 4:

Line 23, "auto focus" should read --auto-focus--;
    Line 24, "auto focus" should read --auto-focus--;
    Line 25, "L1and" should read --L1 and--; and
    Line 27, "auto focus" should read --auto-focus--.

COLUMN 5:

Line 4, "SEdep" should read --SWdep--;
    Line 9, "swithes" should read --switches--;
    Line 11, "UCON" should read --UCOM--; and
    Line 22, "auto focus" should read --auto-focus--.

COLUMN 6:

Line 34, "microprocessor" should read --microcomputer--.

UNITED STATES PATENT AND TRADEMARK OFFICE
CERTIFICATE OF CORRECTION

PATENT NO. : 5,038,164

DATED : August 6, 1991

INVENTOR(S) : YOSHIHITO HARADA

It is certified that error appears in the above-identified patent and that said Letters Patent is hereby corrected as shown below:

COLUMN 8:

Line 3, "routine" should read --routine.--;
Line 43, "DISP(0) = -0" should read --DISP(0) = 0 --, and "form" should read --from--.

COLUMN 9:

Line 24, "assumption," should read --assumptions,--, and "DISP(0) °12.8" should read --DISP(0) ≃ 12.8--; and
Line 53, "noncoincidence" should read --non-coincidence--.

COLUMN 10:

Line 19, "step 18" should read --steps 18--.

COLUMN 11:

Line 7, "5" should be deleted;
Line 20, " "ISP(k)" should read --"DISP(k)--;
Line 31, "DISP(1) = -11." should read --DISP(1) = -11.5--;
Line 61, "AvL" should read --AVL--; and
Line 68, "step 19" should read --steps 19--.

UNITED STATES PATENT AND TRADEMARK OFFICE
CERTIFICATE OF CORRECTION

PATENT NO. : 5,038,164

DATED : August 6, 1991

INVENTOR(S) : YOSHIHITO HARADA

It is certified that error appears in the above-identified patent and that said Letters Patent is hereby corrected as shown below:

COLUMN 12:

Line 7, "+ 11.5 and - 11.5," should read -- -11.5 and + 11.5,--.

COLUMN 14:

Line 25, "micro computer." should read --microcomputer--.

COLUMN 15:

Line 39, "setting" should read --automatically setting--; and
    Line 53, "infocus" should read --in-focus--.

COLUMN 16:

Line 12, "infocus" should read --in-focus--; and
    Line 64, "autofocus" should read --auto-focus--.

COLUMN 17:

Line 18, "a infocus" should read --an in-focus--.

Signed and Sealed this

Sixteenth Day of November, 1993

BRUCE LEHMAN

*Attesting Officer*      *Commissioner of Patents and Trademarks*